(12) United States Patent
Raichle et al.

(10) Patent No.: US 9,183,682 B2
(45) Date of Patent: Nov. 10, 2015

(54) UNIVERSAL VEHICLE INPUT/OUTPUT TRANSCEIVER AND METHOD OF OPERATION THEREOF

(71) Applicant: Bosch Automotive Service Solutions LLC, Warren, MI (US)

(72) Inventors: Kurt Raichle, Owatonna, MN (US); Marco Le Brun, Florence (IT); Manokar Chinnadurai, Owatonna, MN (US); Phillip McGee, Owatonna, MN (US)

(73) Assignee: Bosch Automotive Service Solutions Inc., Warren, MI (US)

(*) Notice: Subject to any disclaimer, the term of this patent is extended or adjusted under 35 U.S.C. 154(b) by 0 days.

(21) Appl. No.: 14/154,467

(22) Filed: Jan. 14, 2014

(65) Prior Publication Data

US 2014/0129079 A1 May 8, 2014

Related U.S. Application Data

(63) Continuation of application No. 12/123,698, filed on May 20, 2008, now Pat. No. 8,630,766.

(51) Int. Cl.
*H04Q 9/00* (2006.01)
*G07C 5/00* (2006.01)
*G07C 5/08* (2006.01)

(52) U.S. Cl.
CPC .............. *G07C 5/008* (2013.01); *G07C 5/0808* (2013.01); *H04Q 9/00* (2013.01); *G07C 2205/02* (2013.01); *H04Q 2209/823* (2013.01)

(58) Field of Classification Search
CPC .. G07C 5/008; G07C 5/0808; G07C 2205/02; G07C 5/08–5/0816; G07C 5/0841–5/0858; H04Q 9/00; H04Q 2209/823; H04Q 9/06; G05B 23/027; G05B 23/00–23/02; G05B 23/0208; G05B 23/0213; G05B 2219/15028; G05B 2219/23269; G05B 2219/25217; G05B 2219/31174; G05F 5/00
See application file for complete search history.

(56) References Cited

U.S. PATENT DOCUMENTS

| 4,853,850 | A | * | 8/1989 | Krass et al. ............... 701/33.6 |
| 5,442,553 | A | | 8/1995 | Parrillo |
| 5,459,660 | A | | 10/1995 | Berra |
| 5,555,498 | A | | 9/1996 | Berra et al. |
| 5,598,093 | A | | 1/1997 | Acatrinei |
| 5,646,865 | A | | 7/1997 | Alfaro et al. |
| 5,737,711 | A | | 4/1998 | Abe |
| 5,790,965 | A | | 8/1998 | Abe |
| 5,815,071 | A | | 9/1998 | Doyle |
| 5,848,064 | A | | 12/1998 | Cowan |
| 5,884,202 | A | | 3/1999 | Arjomand |
| 5,922,037 | A | | 7/1999 | Potts |
| 6,006,147 | A | | 12/1999 | Hall et al. |
| 6,181,992 | B1 | | 1/2001 | Gurne et al. |
| 6,407,554 | B1 | | 6/2002 | Godau et al. |
| 6,526,340 | B1 | | 2/2003 | Reul et al. |
| 6,538,472 | B1 | | 3/2003 | McGee |
| 6,603,394 | B2 | | 8/2003 | Raichle et al. |

(Continued)

*Primary Examiner* — Bao Long T Nguyen
(74) *Attorney, Agent, or Firm* — Baker & Hostetler LLP

(57) ABSTRACT

A vehicular diagnostic tool configured to interface with a plurality of vehicular computing systems that each utilize a different communications protocol. The tool includes a transceiver that itself includes a voltage threshold controller and a current threshold controller. Also, a method of using a single vehicular diagnostic tool to communicate with a plurality of vehicular computing systems that each utilize a different communications protocol.

10 Claims, 3 Drawing Sheets

(56) References Cited

U.S. PATENT DOCUMENTS

| | | |
|---|---|---|
| 6,662,087 B1 | 12/2003 | Liebl et al. |
| 6,772,248 B1 | 8/2004 | McClure et al. |
| 6,915,108 B2 | 7/2005 | Tsai et al. |
| 7,103,460 B1 | 9/2006 | Breed |
| 7,170,394 B2 * | 1/2007 | Chandler et al. ........... 340/12.32 |
| 7,406,339 B2 * | 7/2008 | Bazarjani et al. .......... 455/569.1 |
| 7,885,658 B2 | 2/2011 | Jiang et al. |
| 2004/0218326 A1 * | 11/2004 | Duren et al. .................. 361/93.1 |
| 2006/0217855 A1 | 9/2006 | Chinnadurai et al. |
| 2007/0135981 A1 | 6/2007 | Raichle et al. |
| 2007/0198147 A1 * | 8/2007 | Keith et al. ..................... 701/29 |

* cited by examiner

UNIVERSAL VEHICLE INPUT/OUTPUT TRANSCEIVER AND METHOD OF OPERATION THEREOF

CROSS-REFERENCE TO RELATED APPLICATIONS

This application claims priority to and is a continuation of U.S. patent application entitled, UNIVERSAL VEHICLE INPUT/OUTPUT TRANSCEIVER AND METHOD OF OPERATION THEREOF, filed May 20, 2008, having a Ser. No. 12/123,698, the disclosure of which is hereby incorporated by reference in its entirety.

FIELD OF THE INVENTION

The present invention relates generally to vehicular diagnostic tools and methods for diagnosing vehicles. More particularly, the present invention relates to vehicular diagnostic tools and vehicular diagnostic methods that allow for communication with multiple types of vehicular computing systems.

BACKGROUND OF THE INVENTION

Currently available vehicular diagnostic tools are devices that are designed to communicate with the various computing systems that are included within modern vehicles. During these communications, information about the operation of vehicular systems (e.g., anti-lock braking systems, air conditioning systems, transmissions, steering mechanisms, etc.) is transferred to the tools. Then, mechanics use the information obtained by the tools to determine the repairs that the vehicles need, if any.

Today's vehicular diagnostic tools are either configured to communicate with vehicular computing systems using a single communications protocol or are configured to accommodate the use of multiple communications protocols through the use of relatively complex and expensive circuitry. As such, a currently available vehicular diagnostic tool that is configured to communicate using the Society of Automotive Engineers (SAE) J1850 communications protocol is either incapable of communicating with a vehicular computing system that utilizes the ISO 9141 communications protocol or does so by utilizing the above-mentioned relatively complex and expensive circuitry. Therefore, if a mechanic wishes to obtain information from a first vehicular computing system that utilizes the SAE J1850 communications protocol and also wishes to obtain information from a second vehicular computing system that utilizes the ISO 9141 communications protocol, the mechanic will either have to use two separate tools or a relatively expensive multi-protocol tool.

SUMMARY OF THE INVENTION

At least in view of the above, it would be desirable to provide novel apparatuses (e.g., vehicular diagnostic tools) that are configured to communicate with vehicular computing systems using a plurality of communications protocols. It would also be desirable to provide novel methods for communicating with multiple vehicular computing systems using a plurality of communications protocols using a single apparatus. It would further be desirable for each of these novel apparatuses to contain a single transceiver portion, so as to minimize complexity, cost and power requirements.

The foregoing needs are met, to a great extent, by one or more embodiments of the present invention. According to one such embodiment, a vehicular diagnostic tool is provided. The tool includes an interface configured to be electronically connected to a vehicular computing system. The tool also includes a transceiver electronically connected to the interface. According to certain embodiments of the present invention, the transceiver itself includes a voltage threshold controller.

In accordance with another embodiment of the present invention, a method of diagnosing a vehicle is provided. The method includes receiving a first signal from a vehicular electronic system using a diagnostic tool. The method also includes adjusting a voltage threshold within the diagnostic tool. In addition, the method also includes processing the first signal based upon the adjusted voltage threshold.

In accordance with yet another embodiment of the present invention, another vehicular diagnostic tool is provided. This tool includes means for receiving a first signal from a vehicular electronic system. This tool also includes means for adjusting a voltage threshold of the means for receiving, wherein the means for adjusting is electronically connected to the means for receiving. In addition, this tool includes means for processing the first signal using the adjusted voltage threshold, wherein the means for processing is electronically connected to the means for receiving.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
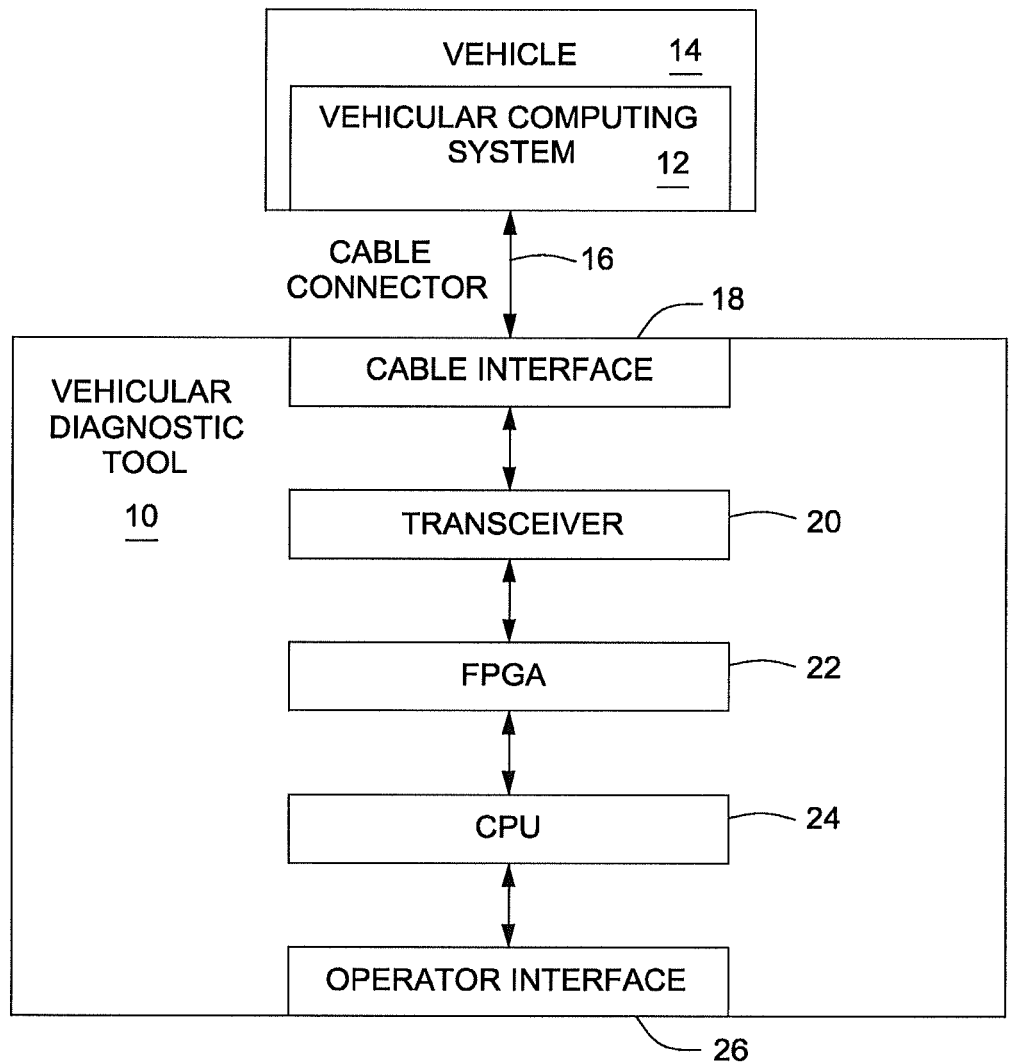
FIG. 1 is a block diagram illustrating a vehicular diagnostic tool according to an embodiment of the present invention wherein the tool is connected to a vehicular computing system of a vehicle through a cable connector.

The invention will now be described with reference to the drawing figures, in which like reference numerals refer to like parts throughout. FIG. 1 is a block diagram illustrating a vehicular diagnostic tool 10 according to an embodiment of the present invention wherein the tool 10 is connected to a vehicular computing system 12 of a vehicle 14 through a cable connector 16.

According to certain embodiments of the present invention, the diagnostic tool 10 illustrated in FIG. 1 is handheld and battery powered (e.g., powered by one or more 9V batteries). However, larger and/or more complex diagnostic tools are also within the scope of the present invention, as are tools that may be plugged in to electrical outlets.

The vehicle 14 illustrated in FIG. 1 is an automobile and the vehicular computing system 12 is part of the anti-lock braking system of the automobile. However, other vehicles, for example, trucks, boats, planes, helicopters, agricultural vehicles/equipment (e.g., harvesters) and construction vehicles/equipment (e.g., excavators) are also within the scope of the present invention, as are electrical power generators and a variety of other machines that, in the context of the present invention, also fall within the scope of the term "vehicle". Also, other vehicular computing systems such as, for example, computing systems included in air conditioning systems, transmission systems, fuel injection systems, etc., are also within the scope of the present invention.

The cable connector 16 illustrated in FIG. 1, on one end thereof, is connected either directly or indirectly (e.g., through a vehicular interface which is not illustrated in FIG. 1) to the vehicular computing system 12. On the other end thereof, the cable connector 16 is connected to a cable interface 18 that is included in the diagnostic tool 10. In operation, the cable connector 16 transfers electronic signals between the vehicle 14 and the diagnostic tool 10. As such, the cable connector 16 may be any type of cable or interface wiring harness capable of transferring such electronic signals. For example, an SAE standard J1962 connector may be used. However, wireless connections between the vehicular computing system 12 and the diagnostic tool 10 are also within the scope of the present invention. Such wireless connections do not make use of the above-discussed cable connector 16.

As illustrated in FIG. 1, a transceiver 20 is electronically connected to the cable interface 18 within the diagnostic tool 10. In turn, a Field Programmable Gate Array (FPGA) 22 is electronically connected to the transceiver 20, a Central Processing Unit (CPU) 24 is electronically connected to the FPGA 22 and an operator interface 26 is electronically connected to the CPU 24. The operator interface 26 may include, for example, one or more keys or buttons, a graphical interface and/or a touch screen.

Figure 2:
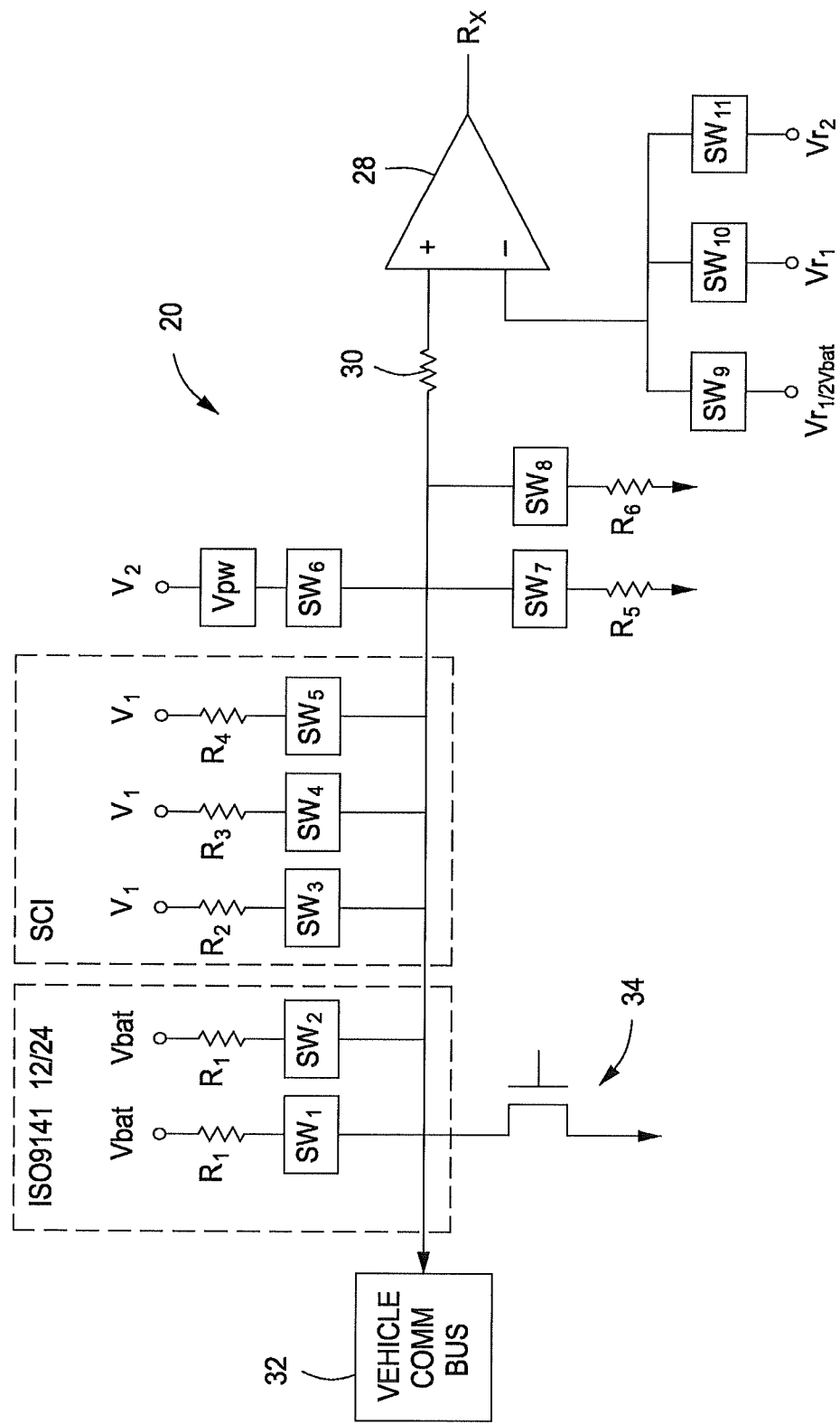
FIG. 2 is a schematic diagram of the transceiver illustrated in FIG. 1 according to an embodiment of the present invention.

FIG. 2 is a schematic diagram of the transceiver 20 illustrated in FIG. 1 according to an embodiment of the present invention. The transceiver 20 illustrated in FIG. 2 includes an operational amplifier (op-amp) 28 and a safety resistor 30 that is electronically connected to an input of the op-amp 28. Also electronically connected to the op-amp 28 is a plurality of switches $SW_1$-$SW_{11}$. By appropriately setting the switches $SW_1$-$SW_{11}$, one or more of a plurality of impedances (i.e., resistors $R_1$-$R_6$), a plurality of voltages $V_{bat}$, $V_1$, $V_2$ and/or a plurality of reference voltages $Vr_{1/2bat}$, $Vr_1$, $Vr_2$ that are electronically connected to the switches $SW_1$-$SW_{11}$ may be electronically connected to or electronically disconnected from the op-amp 28. All of the above-listed components, including the op-amp 28, may also be electronically connected to or disconnected from a vehicular communications bus 32 that is electronically connected to the op-amp 28. In addition, a transistor 34 is electronically connected to the op-amp 28 and to the communications bus 32.

According to certain embodiments of the present invention, during operation of the vehicular diagnostic tool 10 illustrated in FIG. 1, the switches $SW_1$-$SW_6$ illustrated in FIG. 2 may be used to: (1) control the voltage level of the communications bus 32; (2) control the overall load on the communications bus 32; and (3) regulate the current level in the transceiver 20. The switches $SW_7$-$SW_8$ may also be used to control the overall load on the bus 32. However, the switches $SW_9$-$SW_{11}$ are typically used to set the threshold voltage for the incoming (i.e., received) signal $R_x$ which is received by the transceiver 20 on the right-hand side of the op-amp 28 illustrated in FIG. 2.

The voltage levels $V_{bat}$, $V_1$, $V_2$, $Vr_{1/2bat}$, $Vr_1$ and $Vr_2$ are selected based on the particular communications protocol used by the above-discussed computing system 12. For example, according to certain embodiments of the present invention, $V_{bat}$ is selected to be approximately 12V or approximately 24V in order to accommodate the ISO9141 protocol, $V_1$ is selected to be approximately 5V in order to accommodate the serial communication interface (SCI) and the data communications link (DCL) protocols and $V_2$ is selected to be approximately 12V in order to accommodate the Variable Pulse Width (VPW) protocol. Likewise, according to certain embodiments of the present invention, $Vr_{1/2bat}$ is selected to be approximately 6V or approximately 12V and $Vr_1$ and $Vr_2$ are selected to be approximately 3.3V and approximately 2.5V, respectively.

Figure 3:
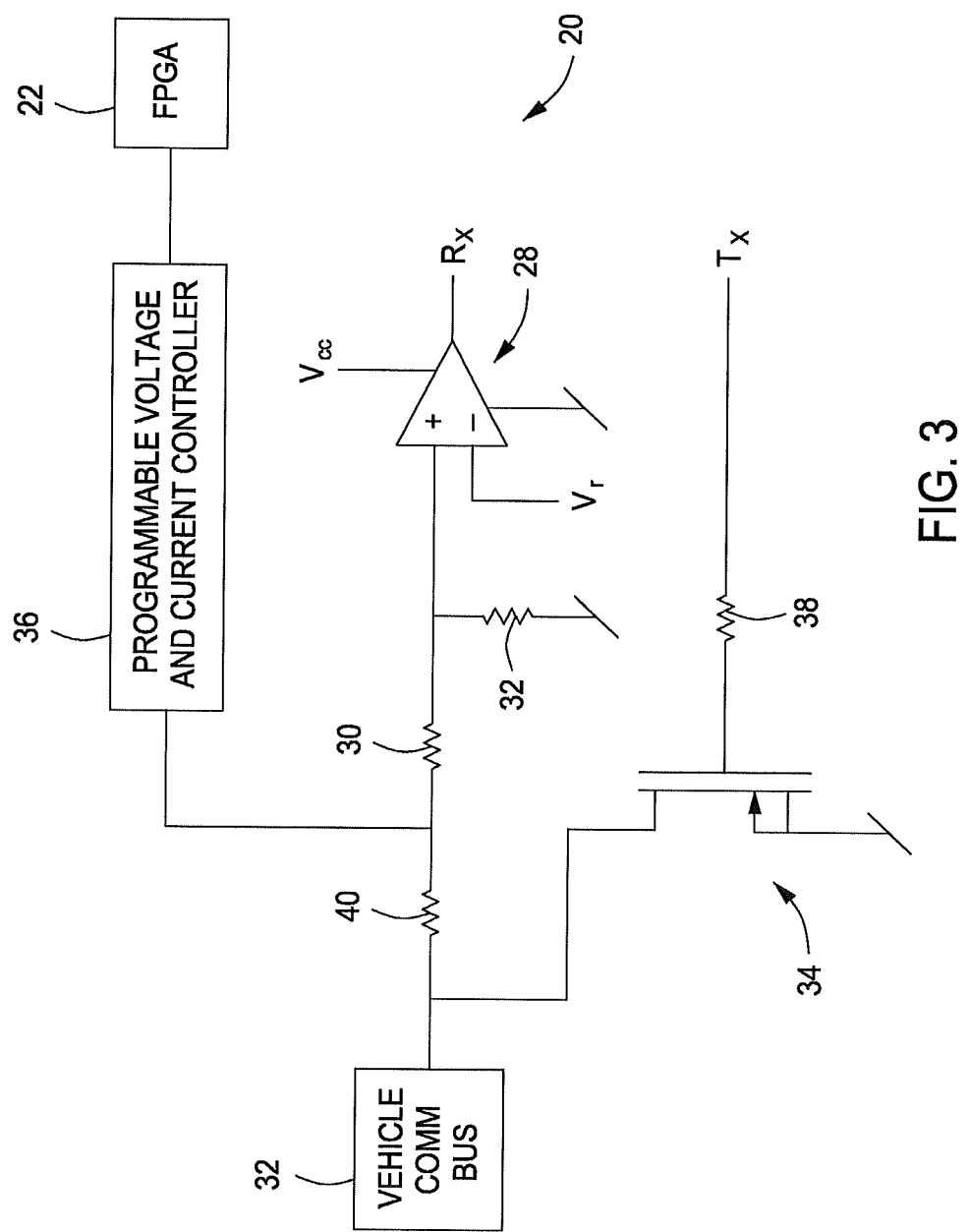
FIG. 3 is a schematic diagram of the transceiver illustrated in FIG. 1 according to another embodiment of the present invention.

FIG. 3 is a schematic diagram of the transceiver 20 illustrated in FIG. 1 according to another embodiment of the present invention. The transceiver 20 illustrated in FIG. 3 is electronically connected to the FPGA 22 and to the communications bus 32. In operation, the transceiver 20 receives a signal $R_x$ from the vehicular computing system 12 and/or transmits a signal $T_x$ to the vehicular computing system 12.

The switches $SW_1$-$SW_{11}$ and the various voltages and resistances electronically connected thereto in FIG. 2 are replaced by a programmable voltage and current controller 36 in FIG. 3. However, analogously to what is illustrated in FIG. 2, the received signal $R_x$ illustrated in FIG. 3 is received by an op-amp 28. Also analogously to what is illustrated in FIG. 2, FIG. 3 illustrates that a transistor 34 (in this instance, an n-channel MOSFET) is electronically connected to the op-amp 28, as are a trio of resistors 30, 32 and 40.

Also illustrated in FIG. 3 is a fourth resistor 38 that functions as a safety resistor and that is electronically connected to the transistor 34. The op-amp 28 illustrated in FIG. 3 is electronically connected to a variable reference voltage Vr and an amplifier supply voltage $V_{cc}$.

By appropriately operating the switches $SW_1$-$SW_{11}$ illustrated in FIG. 2, a number of different and discrete voltage, current and/or resistance levels may be obtained within the circuitry of the transceiver 20 illustrated in FIG. 2. As such, the electronically interconnected switches $SW_1$-$SW_{11}$ and the components electronically connected thereto (i.e., voltage sources, resistors, etc.) may be used as a voltage threshold controller and/or a current threshold controller. For example, if switch $SW_1$ and switch $SW_2$ are set to electronically connect the two illustrated $V_{bat}$ voltage levels to the remainder of the circuitry in parallel, the effective bus voltage will be ½$V_{bat}$. According to certain embodiments of the present invention, such use of the physical switches $SW_1$-$SW_{11}$ simplifies the overall circuitry of the transceiver 20 and reduces the cost of the production thereof.

In contrast, by replacing the switches $SW_1$-$SW_{11}$ illustrated in FIG. 2 with the programmable voltage and current controller 36 illustrated in FIG. 3, the voltage and resistance threshold levels obtainable within the circuitry of the transceiver 20 illustrated in FIG. 3 effectively become continuously variable. As such, a greater number of communications protocols become readable by the above-discussed vehicular diagnostic tool 10 containing the transceiver 20 illustrated in FIG. 3 than the transceiver 20 illustrated in FIG. 2.

The transistor 34 illustrated in FIGS. 2 and 3, according to certain embodiments of the present invention, is a field effect transistor such as, for example, a metal-oxide semiconductor field-effect transistor (MOSFET). The transistor 34, according to certain embodiments of the present invention, allows for the circuit to be pulled down to a voltage level of substantially zero volts without the use of a switch or the operation of a voltage controller.

According to certain embodiments of the present invention, methods of diagnosing a vehicle (e.g., the above-discussed vehicle 14) are provided. According to one such method, a first signal is received from a vehicular computing system (e.g., system 12) using a diagnostic tool such as, for example, the vehicular diagnostic tool 10 illustrated in FIG. 1. The received first signal may, for example, be a signal that conforms to the specifications of a communications protocol such as J1850, ISO 9141, etc. Thus, the method typically includes associating the first signal with a communications protocol. In some instances, this associating step and/or a step of distinguishing between this received first signal and a second received signal (e.g., noise or a signal from another vehicular computing system) is based upon a bit pattern included in the first signal.

Once the first signal has been received and identified, a voltage threshold within the diagnostic tool is typically adjusted to accommodate processing of the received first signal according to the guidelines of the communications protocol in question. When implementing this voltage threshold adjusting step, one or more of the switches $SW_1$-$SW_6$ illustrated in FIG. 2 may be switched on or off to provide the appropriate voltage level. In the circuitry illustrated in FIG. 3, the programmable voltage and current controller 36 may be used to obtain the desired voltage level in the transceiver 20. According to certain embodiments of the present invention, this voltage threshold adjusting step is implemented using software.

As mentioned above, the programmable voltage and current controller 36 allows for the voltage threshold to be set at virtually any level (at least between a maximum and a minimum voltage level supported by the controller 36). However, in order to accommodate several of the more widely used communications protocols, the voltage threshold is commonly set to one of approximately 0.0V, approximately 2.5V, approximately 3.3V, approximately 5.0V, approximately 9.0V or approximately 12.0V.

According to certain embodiments of the present invention, the above-discussed method of diagnosing a vehicle further includes adjusting a current threshold within the diagnostic tool. Depending on the types of components included in the circuitry of the transceiver in question, one or more switches (e.g., switches $SW_1$-$SW_8$) and/or a programmable voltage and current controller (e.g., controller 36) may be used to adjust the current threshold level. Like the voltage threshold level, the current threshold level is typically adjusted in order to accommodate a particular communications protocol. Also, the current threshold level may be adjusted utilizing software.

The above-discussed steps relating to adjustment of the voltage and current threshold levels may be automatically implemented once a signal has been received in the diagnostic tool from a vehicle. However, according to certain other embodiments of the present invention, a technician, mechanic or other operator of the diagnostic tool may pre-set the switch configuration or the configuration of the programmable voltage and current controller based upon the vehicle and/or vehicular computing system that is to be analyzed. According to such embodiments, the technician may, for example, enter information about the manufacturer, model, year, etc., of the vehicle into the diagnostic tool before the tool is electronically connected to the vehicle. Then, the tool may use that information to set the appropriate voltage and current levels before being electronically connected to the vehicle.

According to certain other embodiments of the present invention, the appropriate communications protocol is automatically detected by first adjusting the threshold levels within the diagnostic tool within a predetermined set of configurations (i.e., levels). Then, for each configuration, an attempt is made at passively reading one or more bit patterns from the vehicular computing system until the appropriate protocol is identified and communication is established. Alternatively, active communication with the vehicular computing system may be attempted with each configuration until the appropriate protocol is identified and communication is established.

In addition to adjusting the threshold voltage and current levels, certain methods according to the present invention also allow for the adjustment of a reference voltage within the diagnostic tool. Again, this adjustment is typically made to accommodate the specifications of a particular communications protocol. Also, this adjustment step may be implemented using either one or more switches (e.g., switches $SW_9$-$SW_{11}$ in FIG. 2) or the above-discussed programmable voltage and current controller. This adjustment step may further be implemented, for example, using software.

Once the appropriate voltage threshold, current threshold and/or reference voltage levels have been set, the received first signal (e.g., $R_x$) may then be processed based upon the adjusted levels. Any signals to be transmitted to the vehicle (e.g., $T_x$) may be similarly processed through substantially the same levels and forwarded to the vehicle. Based on this exchange of signals, a wide variety of vehicular computing systems using a wide variety of communications protocols may be analyzed using a single diagnostic tool.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool, comprising:
   an interface configured to be communicatively connected to a vehicle computing system via a communication protocol;
   a transceiver electronically connected to the interface; and
   a voltage threshold controller configured to adjust a voltage threshold within the diagnostic tool based on the communication protocol by controlling a plurality of impedances and a plurality of voltage levels of the transceiver with a plurality of switches, wherein the plurality of switches is connected to the voltage threshold controller, the plurality of impendences, and a plurality of reference voltages, the plurality of switches further controls a current level in the transceiver, and wherein the transceiver is configured to automatically detect the communication protocol with the voltage threshold controller by reading one or more bit patterns from the vehicle computing system.

2. The diagnostic tool of claim 1, wherein the plurality of switches is also connected to the plurality of voltage levels.

3. The diagnostic tool of claim 1, where the plurality of switches further to controls an overall load on a communication bus.

4. The diagnostic tool of claim 3, wherein the communication bus communicates with a transistor, and an operational amplifier.

5. The diagnostic tool of claim 4, wherein the transistor comprises a field effect transistor.

6. The diagnostic tool of claim 1, wherein the plurality of switches is electronically connected to an operational amplifier, and wherein based on a setting of the plurality of switches, one or more of the plurality of impendences, and the plurality of reference voltages is electronically connected to or disconnected from the operational amplifier.

7. The diagnostic tool of claim 6, wherein a safety resistor is electronically connected to the operational amplifier.

8. The diagnostic tool of claim 1, wherein the plurality of switches adjusts a reference voltage within the diagnostic tool.

9. The diagnostic tool of claim 1 further comprising:
   a field programmable gate array electronically connected to the transceiver.

10. The diagnostic tool of claim 1, wherein the settings of the plurality of switches causes one or more of the plurality of switches to be turned on or off.

* * * * *